United States Patent

Cox, Jr. et al.

[11] Patent Number: 5,832,439
[45] Date of Patent: Nov. 3, 1998

[54] METHOD AND SYSTEM FOR LINGUISTIC COMMAND PROCESSING IN A VIDEO SERVER NETWORK

[75] Inventors: Louis A. Cox, Jr., Denver; Hans-Peter Mueller, Longmont; Paul M. Bauer, Louisville, all of Colo.

[73] Assignees: U S West, Inc., Englewood; MediaOne Group, Inc,, Denver, both of Colo.

[21] Appl. No.: 572,095

[22] Filed: Dec. 14, 1995

[51] Int. Cl.[6] .................................................. G10L 9/06
[52] U.S. Cl. ...................... 704/275; 704/257; 704/254
[58] Field of Search .................................. 395/2.4, 2.59, 395/2.58, 2.64, 2.63, 2.79, 2.84; 704/275, 231, 250, 255, 254, 270, 257

[56] References Cited

U.S. PATENT DOCUMENTS

| | | | |
|---|---|---|---|
| 4,227,176 | 10/1980 | Moshier | 395/2.4 |
| 4,569,026 | 2/1986 | Best | 395/327 |
| 4,667,293 | 5/1987 | Krieger et al. | 364/409 |
| 4,907,079 | 3/1990 | Turner et al. | 358/84 |
| 5,086,385 | 2/1992 | Launey et al. | 395/2.84 |
| 5,117,407 | 5/1992 | Vogel | 369/30 |
| 5,170,426 | 12/1992 | D'Alessio et al. | 379/38 |
| 5,199,077 | 3/1993 | Wilcox et al. | 395/2.52 |
| 5,199,080 | 3/1993 | Kimura et al. | 381/110 |
| 5,247,580 | 9/1993 | Kimura et al. | 395/2.84 |
| 5,313,522 | 5/1994 | Slager | 395/2.85 |
| 5,329,608 | 7/1994 | Bocchiery et al. | 395/2.52 |
| 5,335,313 | 8/1994 | Douglas | 395/2.84 |
| 5,357,596 | 10/1994 | Takebayashi | 704/275 |
| 5,371,901 | 12/1994 | Reed et al. | 455/69 |
| 5,384,833 | 1/1995 | Cameron | 395/2.84 |
| 5,386,494 | 1/1995 | White | 395/2.84 |
| 5,390,238 | 2/1995 | Kirk et al. | 379/93 |
| 5,577,165 | 11/1996 | Takebayashi et al. | 395/2.84 |
| 5,642,519 | 6/1997 | Martin | 395/759 |

OTHER PUBLICATIONS

IBM Technical disclosure bulletin, "Integrated Audio–Graphics Interface", vol. 33 No. 11 pp. 368–371, Apr. 1991.
ICASSP–94. 1994 IEEE International Conference on Acoustics, Speech and Signal processing, Itoh et al., "Sentence spotting applied to partial sentence and unknown words", vol. 1 pp. 369–372, Apr. 1994.
ICASSP–93. IEEE International Conference on Acoustics, Speech and Signal processing, Crim, "Learning speech semantics with keyword classification trees", vol. 2 pp. 55–58, Mar. 1993.
ICASSP–94. IEEE International Conference on Acoustics, Speech and Signal processing, Matsu, "A multimodal, keyword–based spoken dialogue", vol. 2 pp. 33–36, Apr. 1994.

Primary Examiner—Richemond Dorvil
Attorney, Agent, or Firm—Brooks & Kushman, PC

[57] ABSTRACT

A method for providing a user with the facility to linguistically direct a computer system to present desired audio/video programming is provided. The method is intended to be used in conjunction with a computer system having an input device, an audio interface, a controller, and a monitor. The method begins with the step of presenting to a user a menu of options at the monitor. The method continues with the step of identifying a set of key phonemes including phonemes associated with the menu of options. The method next includes the step of receiving at the audio interface a command signal representing a linguistic audio command. The command signal is then converted into a command phoneme which is matched with a phoneme of the set of key phonemes. Finally, the controller performs a task associated with the matched phoneme.

4 Claims, 2 Drawing Sheets

METHOD AND SYSTEM FOR LINGUISTIC COMMAND PROCESSING IN A VIDEO SERVER NETWORK

TECHNICAL FIELD

This invention relates to a method and system for providing a user with a linguistic interface for a set top terminal so as to provide desired audio/video programming.

BACKGROUND ART

Prior art interactive spoken dialogue systems and methods have generally focused on understanding a spoken command or sentence in order to perform desired tasks. Such systems are disclosed by Best in U.S. Pat. No. 4,569,026, Kimura et al in U.S. Pat. No. 5,247,580, and Douglas in U.S. Pat. No. 5,335,313. Typically, these systems first try to distinguish every word in an utterance, i.e. a user command. Each word is then compared to every word in the system's vocabulary for recognition. Such a vocabulary typically contains 80,000 words or more. Once every word has been recognized, these systems use sophisticated natural language programs and attempt to recreate an entire sentence structure. Only after the system recognizes an entire sentence can it act on the user command.

The drawbacks to this approach to command processing are readily apparent. Namely, the prior art approach is highly complex and difficult to implement in practice because of not only the varying dialects and intonations of users but also the size of the vocabulary. A large vocabulary requires extraordinary resources, particularly memory, because of the many words that must be recognized in varying contexts within a sentence before a response may be formulated and performed.

Consequently, a need has developed for a simpler approach to linguistic command processing which, like the prior art, is responsive to a large vocabulary, yet unlike the prior art, does require extraordinary resources.

DISCLOSURE OF THE INVENTION

The principle object of the present invention is to provide a method which allows a user to linguistically command a computerized application to perform a desired task.

In carrying out the above-stated objective, a method is provided in accordance with the present invention for use in cooperation with a computer database containing phonemes. The method is specifically directed for use with a computer system having an input device, an audio interface, a controller and a monitor.

The method includes the initial presentation of a menu of options at a monitor. A subset of the computer database of phonemes is then identified. Each phoneme of the subset is a key phoneme associated with an option from the presented menu. Preferably, the subset may also include demi-phonemes or key phonemes associated with submenus of the presented menu.

Next, a command signal is captured by the input device and forwarded to the audio interface. The command signal represents a linguistic audio command generated by the user. The method next includes the step of converting the command signal into a command phoneme. The command phoneme is then matched with at least one key phoneme of the subset of key phonemes. Finally, the system performs a task associated with the matched phoneme.

In further carrying out the above objects and other objects of the present invention, a system is also provided for carrying out the steps of the above described method. The system includes a processor, a memory, an input device, an audio interface, and a monitor. Like the above-described method, the system is directed to providing the user with the facility to linguistically direct the computer system to present desired audio/video programming. The system includes means for presenting a menu of options at the monitor, means for identifying a set of key phonemes including phonemes associated with the menu of options, means for receiving a command signal representing a linguistic audio command, means for converting the command signal into a command phoneme, means for matching the command phoneme with a phoneme of the set of phonemes, and means for performing a task associated with the matched phoneme. In the preferred embodiment, the set of key phonemes associated with the menu includes demi-phonemes. Still further, the set of key phonemes associated with the menu of options includes phonemes associated with the options of submenus.

BRIEF DESCRIPTION OF THE DRAWINGS

A more complete appreciation of the invention and many of the attendant advantages thereof may be readily obtained by reference to the following detailed description when considered with the accompanying drawings in which like reference characters correspond to like parts in all of the views, wherein.

BEST MODES FOR CARRYING OUT THE INVENTION

Figure 1:
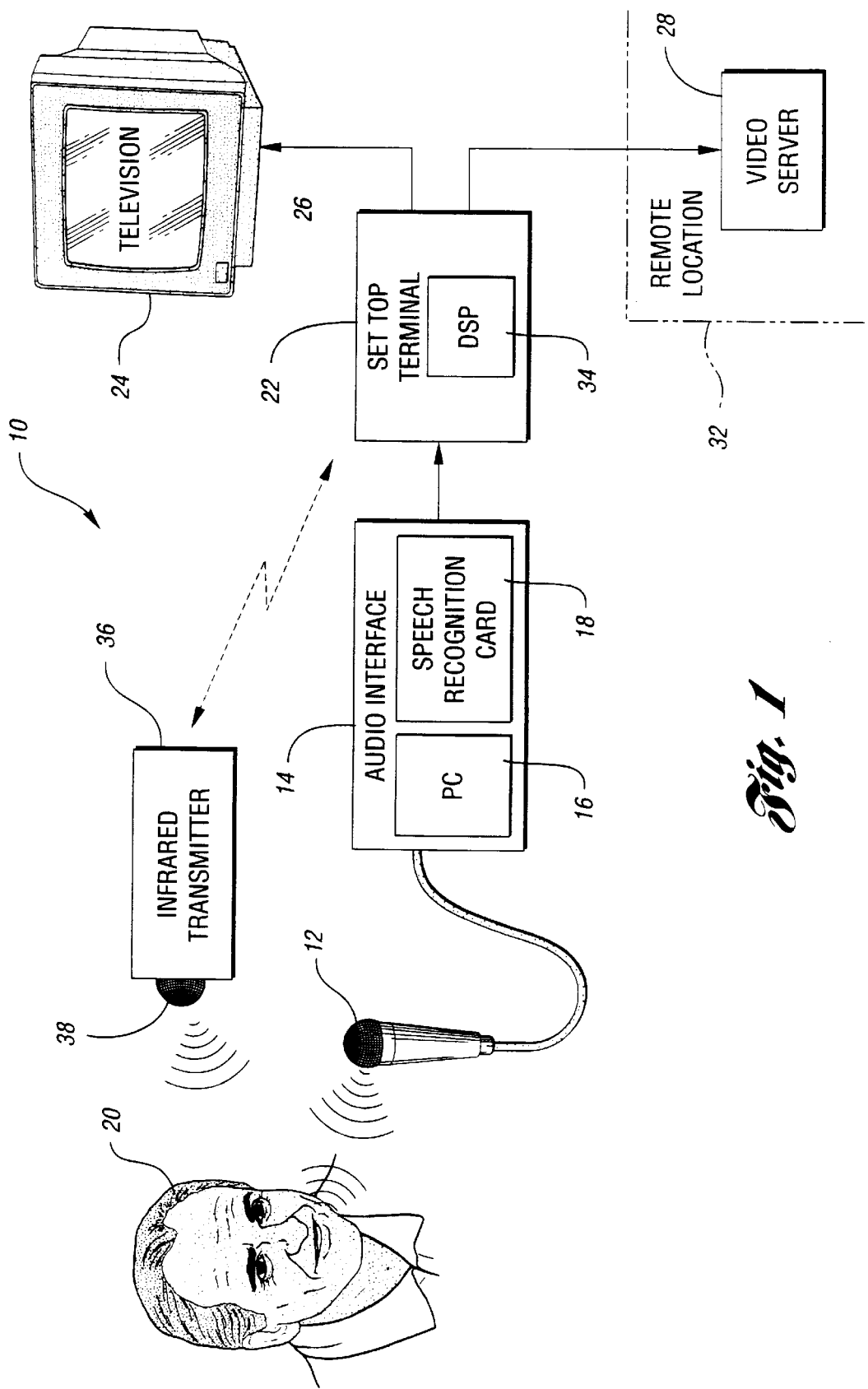
FIG. 1 is a functional block diagram illustrating the system of the present invention.

Referring now to FIG. 1 of the drawings, there is illustrated, in block diagram format, the preferred hardware of the system of the present invention designated generally by reference numeral 10. System 10 includes an audio input device such as a microphone 12. Microphone 12 is provided in electromagnetic communication with an audio interface 14 which includes a processor such as a Personal Computer (PC) 16 and a speech recognition card 18. As described herein, audio interface 14 is operative to store a set of key phonemes and demi-phonemes associated with a menu of options or commands displayed on a monitor, television, or the like. These options include, for example, virtual VCR functions such as PLAY, STOP, FORWARD, REVERSE, etc. as well as more standardized functions such as volume up, down, etc. Specialized commands may also be utilized such as, for example, "JUMP" which may be used to advance a predetermined PLAY time in order to skip objectionable or undesirable programming including commercials, nudity, violence, etc.

In operation, microphone 12 functions to convert a linguistic audio command of user 20 and provide an electromagnetic representative command signal to audio interface 14. Upon receiving the electrical command signal from microphone 12, the processor, here PC 16, converts the command signal into a command phoneme. Next, the processor matches the command phoneme with at least one phoneme of the set of stored key phonemes. The processor then provides a control signal to a control device such as a conventional set top terminal 22 manufactured by Silicon Graphics or its equivalent. The control signal is based on the matched key phoneme.

As shown in FIG. 1, set top terminal 22, sometimes also called a set top box, is provided in electromagnetic communication with audio interface 14. Set top terminal 22 is further provided in electromagnetic communication with a monitor such as television 24 via network 26.

Upon receiving the command signal from audio interface 14, set top terminal 22 processes the command signal and executes the desired command. An example of the operation of the system is provided below.

Consider the situation wherein a user desires to watch the movie "Gone With The Wind". To initiate his or her selection, the user may simply make a verbal request such as "I would like to watch a movie." The entire linguistic audio command will thereafter be converted to an electromagnetic signal and forwarded to audio interface 14. Audio interface 14 converts the command signal into a command and then matches the command phoneme with key phonemes and demi-phonemes associated with the menu option for selecting a movie to identify matched phonemes. Although each of the words of the user command "I would like to watch a movie" may be processed, it is likely that processing will focus on the phonemes for the words "watch" and "movie" which are stored as key phonemes in memory. The matched key phonemes are forwarded to a video server 28 for command processing. The matched key phonemes are uploaded to the set top terminal 22 to reflect new menu selections available on television 24. Once new voice commands are recognized and matched, processor 16 provides a control signal to television 24 which, in turn, processes the command signal and initiate the PLAY mode of the desired "Gone With The Wind" movie.

Thereafter, if the user desires to "rewind," "fast-forward," increase the volume, or perhaps "jump", a similar spoken command may be made. Each of the phonemes of these commands are stored as key phonemes in the audio interface and are recognized and generate control signals in the manner described above in order to effect a command.

Still referring to FIG. 1, it can be seen that both set top terminal 22 and TV/monitor 24 are provided in electromagnetic communication with video server 28 via a network 26. Television 24, set top terminal 22, audio interface 14, and microphone 12 are, of course, located on customer premises whereas video server 26 is located at a remote location 32.

In an alternative embodiment, set top terminal 22 may include a digital signal processor 34 which performs the equivalent functions of audio interface 14. Digital signal processor 34 may also be provided in electromagnetic communication with an infrared transmitter 36 which includes a microphone 38 for receiving the commands of user 20.

Figure 2:
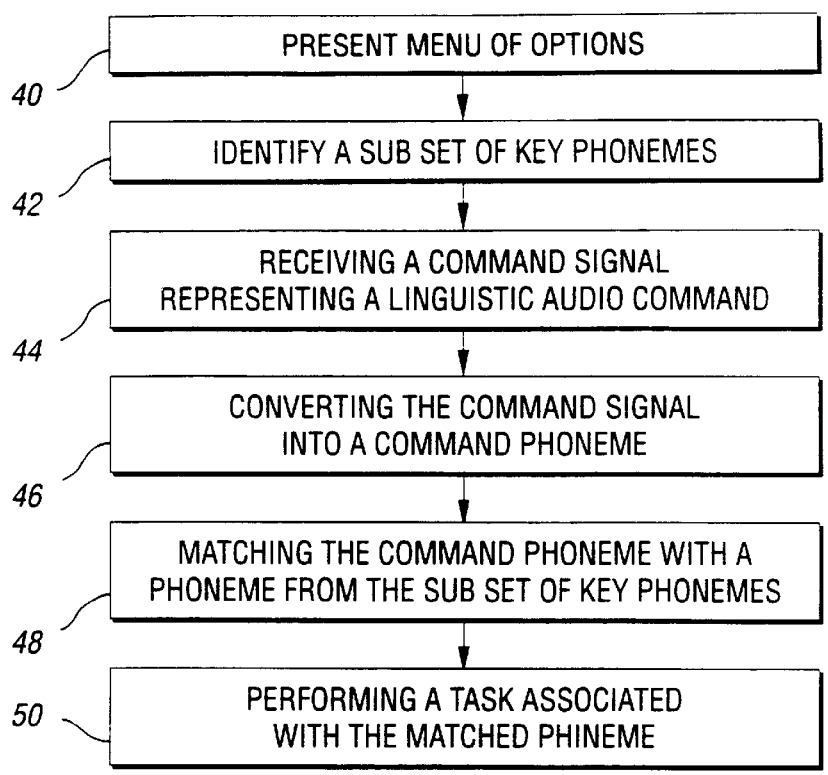
FIG. 2 is a flow diagram illustrating the method steps of the present invention.

A flow chart illustrating the preferred method steps of the present invention is shown in FIG. 2. The method includes the presentation of menu options on a monitor or television as shown in block 40. Thereafter, a sub set of key phonemes is identified as shown in block 42. The method continues with the step of receiving a command signal representing a linguistic audio command from a user as shown at block 44. This signal is generated by an input device such as microphone 12 or infrared transmitter 36 which includes microphone 38 and is received at block 44 by audio interface 14 or its digital signal processor equivalent 34. The command signal is thereafter converted at block 46 into a command phoneme by the audio interface/digital signal processor.

Figure 3:
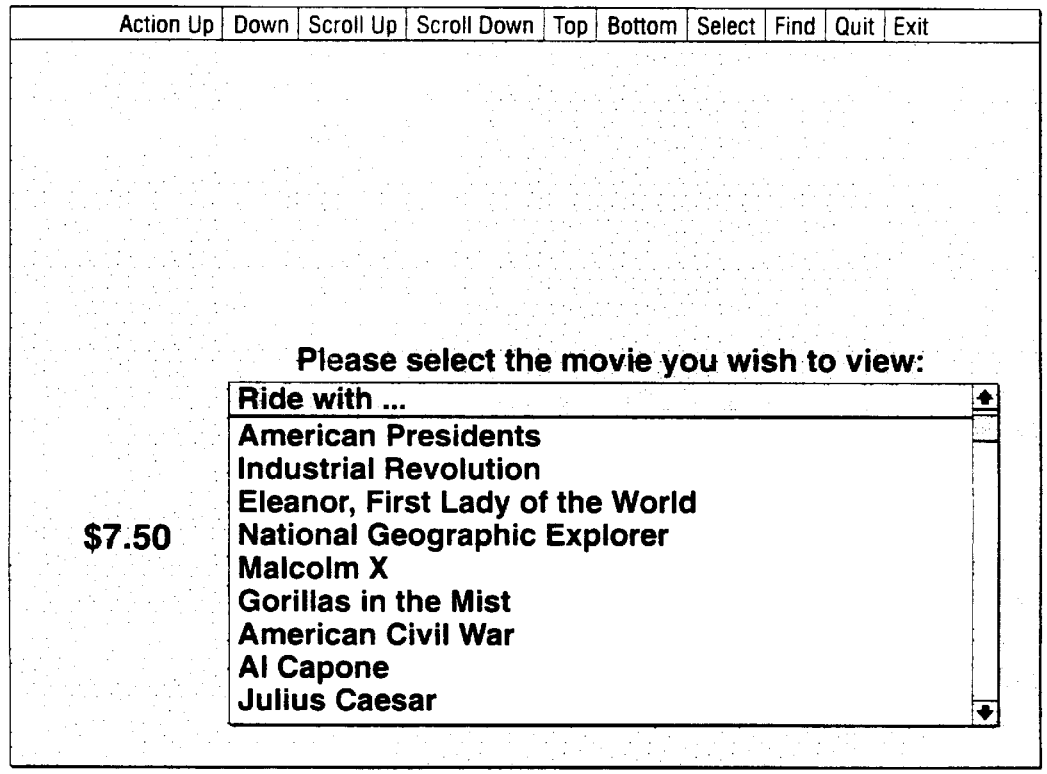
FIG. 3 is a sample screen output obtained when using the present invention.

The method continues with the step of matching at block 48 the command phoneme with a phoneme from the sub set of key phonemes to produce a matched phoneme. A task may thereafter be performed at block 50 associated with a matched phoneme. Such tasks include, for example, virtual VCR functions such as starting, stopping, rewinding, fast-forwarding, etc. as well as more simplified commands such as increasing or decreasing volume, changing brightness, intensity, etc. A typical screen output is shown in FIG. 3.

While the best modes for carrying out the invention has been described in detail, those familiar with the art to which this invention relates will recognize various alternative designs and embodiments for practicing the invention as defined by the following claims.

What is claimed is:

1. A method for use with a computer system having an audio input device, an audio interface, a set top terminal, a video server in communication with the set top terminal via a computer network, and a monitor remotely located from the video server, the method providing a user with the facility to linguistically direct the computer system to present desired audio/video programming from the video server onto the monitor, the method comprising:

presenting a menu of options at the monitor for a user to obtain desired audio/video programming from the video server onto the monitor;

identifying at the audio interface a set of key phonemes including phonemes associated with the menu of options on the monitor, wherein the set of key phonemes includes demi-phonemes and key phonemes associated with the options of sub-menus, wherein the options correspond to videos stored on the video server and virtual Video Cassette Recorder (VCR) functions;

receiving at the audio interface via the audio input device a command signal representing a linguistic audio command of the user;

converting at the audio interface the command signal into a command phoneme;

matching at the audio interface the command phoneme with a phoneme of the set of key phonemes to identify a matched phoneme;

providing a control signal indicative of the matched phoneme from the audio interface to the set top terminal;

processing the control signal indicative of the matched phoneme at the set top terminal; and presenting a video associated with the matched phoneme from the video server onto the monitor in accordance with a command signal from the set top terminal.

2. The method of claim 1 further comprising:

performing virtual VCR functions associated with the matched phoneme to the video presented onto the monitor using the set top terminal.

3. A computer system for providing a user with the facility to linguistically direct the computer system to present desired audio/video programming, the computer system comprising:

an audio input device;

a video server;

a monitor remotely located from the video server for presenting a menu of options to a user to obtain desired audio/video programming from the video server;

an audio interface operative to identify a set of key phonemes including phonemes associated with the menu of options on the monitor, wherein the set of key phonemes includes demi-phonemes and key phonemes associated with the options of submenus, wherein the options correspond to videos stored on the video server and virtual Video Cassette Recorder (VCR) functions, the audio interface further operative to receive from the audio input device a command signal representing a linguistic audio command of the user, convert the command signal into a command phoneme, match the command phoneme with a phoneme of the set of key phonemes to identify a matched phoneme, and generate a control signal indicative of the matched phoneme; and a set top terminal, in communication with the audio interface and the video server via a computer network, for processing the control signal indicative of the matched phoneme and then presenting a video associated with the matched phoneme from the video server onto the monitor.

4. The system of claim 3 wherein:

the set top terminal is further operative to perform virtual VCR functions associated with the matched phoneme to the video presented onto the monitor.

* * * * *

UNITED STATES PATENT AND TRADEMARK OFFICE
CERTIFICATE OF CORRECTION

PATENT NO. : 5,832,439
DATED : November 3, 1998
INVENTOR(S) : Louis A. Cox, Jr., Hans-Mueller and Paul M. Bauer It is certified that error appears in the above-identified patent and that said Letters Patent is hereby corrected as shown below:

On the title page item

[54] In the title delete "IN A VIDEO SERVER NETWORK" insert --OF A SET TOP TERMINAL IN A VIDEO SERVIER NETWORK--

[73] Assignee: Delete "Denver" insert -- Englewood--

Signed and Sealed this

First Day of June, 1999

Attest:

Q. TODD DICKINSON

Attesting Officer

Acting Commissioner of Patents and Trademarks